United States Patent Office 3,352,091
Patented Nov. 14, 1967

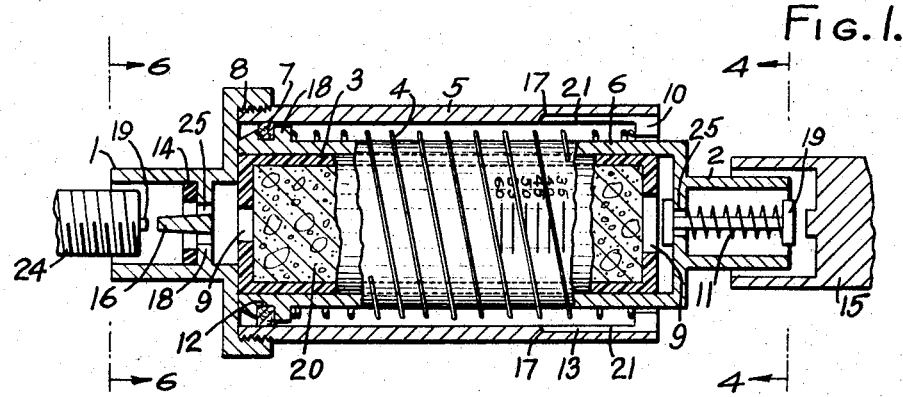
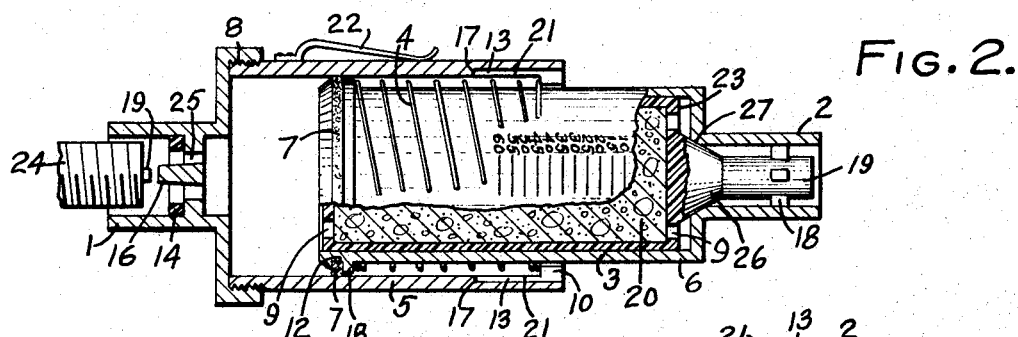
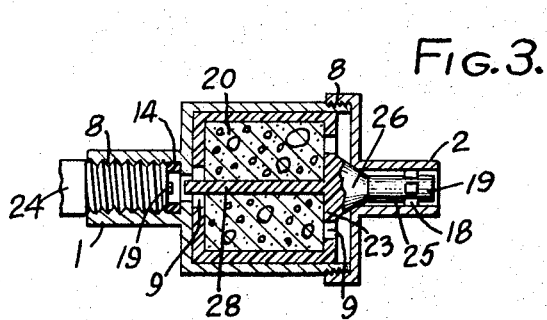
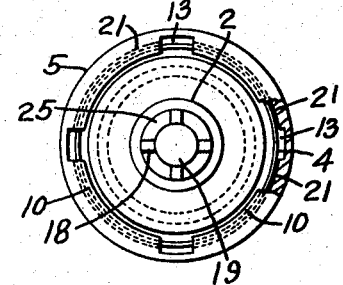
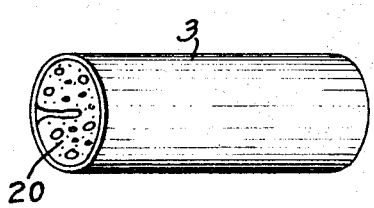
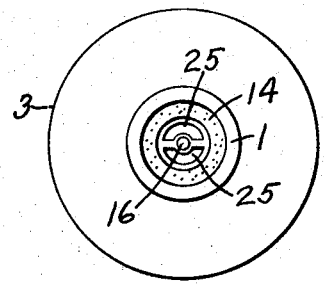
INVENTOR.
Harry Dvorkin

3,352,091
AIR FILTER FOR INFLATABLE TIRES
Harry Dvorkin, Inglewood, Calif.
(6243 Morse Ave., North Hollywood, Calif. 91606)
Filed June 22, 1965, Ser. No. 465,864
1 Claim. (Cl. 55—274)

An object of the invention is to provide an improved air filtering means, which is simpler in construction, easier to use, better adapted for its intended purpose, and relatively less expensive to make than the previous device filed for.

The present application constitutes a continuation-in-part upon the subject matter of my application, Ser. No. 370,817, filed May 28, 1964, now Patent 3,306,011, for Air Filter for Inflatable Tires.

This invention generally relates to an improved ozone and moisture removing means, adapted for placement between a compressed air source outlet, and an inflatable tire.

These together with other objects and advantages which will become subsequently apparent, reside in the details of construction and operation as more fully hereinafter described and claimed, reference being had to the accompanying drawing forming a part hereof, wherein like numerals refer to like parts throughout and in which:

FIGURE 1 shows in side elevation, a device constructed in accordance with the invention a piston and cylinder arrangement of two sections that are capable of elongation against the tension of a coiled spring, containing a filtering means, having two fittings adapted for positioning between an air accumulator valve and the tire stem of an inflatable tire.

FIGURE 2 shows a similar side elevation as FIG. 1, cut away on a horizontal line showing another version of a removably replaceable filter, whose end portion could act as a valve stem.

FIGURE 3 shows in side elevation another version of the device having one threaded fitting that engages threaded portions of an inflatable tire stem. Opposite fitting adapted to engage an air accumulator valve and filter having valve stem that allows an air accumulator valve to depress valve stem of a tire permitting air flow into tire.

FIGURE 4 is a head on view of fitting 2 of FIGURES 1 and 2.

FIGURE 5 is horizontal view of another version of a filter comprising a container shaped to be closely enclosed in the device, having openings in either of the ends, containing any form of foam rubber and water absorbent, or any combination of moisture and ozone absorbent pieces that could be held in a porous form by adhesive means to fill the interior of device.

FIGURE 6 is a head-on view of end portion of FIGURES 1 and 2 showing fitting 1.

In carrying out the invention, referring now specifically to the drawing, there is provided in FIGURE 1 a fitting 1, having centrally positioned in its interior a fixed projection 16. Fitting 1 is of a diameter that allows a close encirclement of a tire stem 24. Circular rubber or resilient washer 14 abutting circular shoulders 18 under pressure of leading edge of 24 makes an airtight engagement between tire stem 24 and fitting 1. Open ports 25 allow compressed air flow when 16 depresses valve stem 19 of 24. Fitting 2 could be of a well known construction and it may be of a similar dimension and function to a tire stem 24 found on inflatable tires, using coiled spring 11 to have valve stem 19 keep open port 25 closed until 19 is depressed. Fitting 1 could be part of a removably threaded cap portion which could engage threaded portion 8 of outer receptacle 5, making an airtight engagement. Inner receptacle 6 could have encircling groove 12 holding a friction-free felt type ring 7 under slight compression against smooth inner walls of 5. Shoulder 18 abuts coiled spring 4 which encircles inner receptacle 6 loosely enough to allow its free motion. Shoulders 10 on extremity of outer receptacle 5 abut other end of coiled spring 4, also allowing free passage and giving direction to movement of inner receptacle 6. Portion of protruding inner receptacle 6 could be calibrated in p.s.i. to align with outer edge of outer receptacle 5. Groves 13 could extend through outer end of outer receptacle 5. Start of grooves 17 could be at any point where the inner receptacle 6's protrusion limit would be reached, allowing excess air pressure to drain from grooves 13 which felt type ring 7 would not obstruct. Lands 21 could be the same level as interior surface of outer receptacle 5. Fitting 1 engaging a tire stem 24 causes entire 6, 3, and 2 portion to extrude out of outer receptacle 5, as the compressed air flow from the inflatable tire is trapped in its interior by the friction-free felt type ring 7 or the like and the closure of fitting 2 by valve stem 19 causing the device to function as an air pressure gauge. The pressure engagement of the air accumulator valve 15 on fitting 2 could simultaneously depress the valve stems 19 of both the tire stem and fitting 2, allowing the flow of compressed air into 24 from 15 permitting the checking of the tires' air pressure without removal of the device from the tire stem 24. Filter 3 could be any container which would fill the interior of inner receptacle 6 and having any combination of either chemical or porous moisture absorbents with foam rubber in any form or any other ozone absorbent in any form. Filter 3 could have any number of openings to expose its contents to the flow of air between fittings 1 and 2. Elastic rubber band 29 could encircle filter 3 and be compressed between inner surface of inner receptacle 6 and surface of filter 3 and both holding motionless and preventing air flow around the filter 3. Filter 3 could also contain any form of a water soluble dye which by its contact with water could indicate it by a color change.

FIGURE 2 could be similar to FIGURE 1. A spring clip 22, similar to those found on pens could be part of the device. Device is shown in pressure engagement with inflatable tire stem 24 and, calibration in p.s.i. are visible on outer surface of inner receptacle 6. Said calibration could be in ratio to the amount of compression of coiled spring 4. Filter 3 could be rigid with one end abutting fitting 1 and cap, and opposite end could be a perforated resilient sheet 23 with attached valve stem 19, with shoulders 18 to guide 19 in the interior of 2. Tapered portion 26 would wedge into point of closure 27. With device also in pressure engagement with air accumulator valve 15 would cause valve stem 19 to depress resilient perforated sheet 23, removing tapered portion 26 from point of closure 27 allowing opening to the device interior, filter 3 contents could be similar to that in FIGURE 1.

FIGURE 3 shows another embodiment of the invention in a side elevation. The threaded inner surface of fitting 1 engaging the threaded portion of the tire stem 24. Filter 3 and its container could be of a non-opaque rigid plastic. Rigid stem 28 could be an extension of valve stem 19. When air accumulator valve 15 is in pressure engagement with fitting 2 valve stem 19 and rigid stem 28 depress valve stem 19 of tire stem 24, allowing air passage into tire. Resilient perforated sheet 23 by being made of plastic could by attempting to retain its original shape act to keep rigid stem 28 from contact with 19 of 24.

FIGURE 4 shows similar head on views of device in FIGURES 1 and 2. Fitting 2's interior contains valve stem 19 with shoulders 18 acting as guides, with open ports 25 in between. Coiled spring 4 abuts projecting shoulders 10 which also guides movement of inner receptacle 6. Grooves 13 could be of any depth and width. Lands 21 are the same level as the inner surface of the outer receptacle 5.

FIGURE 5 shows another version of filter 3 being a transparent plastic tube open at either end with a folded rubber sponge wedged inside, allowing sufficient room for air passage. Moisture absorbing means, ozone absorbing means, water soluble dye in any form or combination could be molded in a porous shape to fill interior of device; any adhesive means could be used.

FIGURE 6 shows a head on view of FIGURES 1 and 2 of fitting 1 portion, fitting 1 containing fixed projection 16, rubber washer 14, and open ports 25, with outer receptacle 5.

It will be noted that each of the improvements of the invention as previously filed for and herein described embodies means which co-operate with the tire valve stem of an inflatable tire and an air accumulator valve, which is the outlet fitting of a compressed air system found at gas stations to inflate tires, the improvements generally consist of simplifying the spring means, the filter means, and improving the function with the elimination of some parts. The coiled spring 4 in FIGS. 1 and 2 is of a diameter that allows the free movement of inner receptacle 6 in relation to the outer receptacle 5, in their piston-cylinder arrangement. With friction-free felt type ring 7 or the like, an airtight movable seal acting with the valve stem 19 to have inner receptacle 6 movement respond to amount of compressed air entering fitting 1, compressing coiled spring 4 between shoulders 18 and projecting shoulders 10. Start of grooves 17 and grooves 13 could be any length, depth, or number to allow escape from interior of device of excessive air pressure to allow measurement in p.s.i. within pre-determined limits. Lands 21 are the level extension of the interior surface of the outer receptacle 5 in FIGURES 1 and 2. Fitting 1 could be removably attachable at threaded portion 8 to allow separation of entire 2, 6, 4, and 3 portions.

In FIGURES 2 and 3, the filter 3 uses portions 19, 18, 26, 9, and 23 to act as a one-way valve by keeping opening of fitting 2 closed until valve stem 19 is depressed.

While FIG. 5 shows a filter means of a foam rubber sheet in a transparent plastic cylinder open at both ends, the filter means could be segments of foam rubber, activated bauxite granules, aluminum silicate granules, attapulgus clay granules or other moisture and ozone absorbing means and a water soluble dye means in any form and combination. The openings in filter 3 could be of any size or number to contain its contents.

While the device is shown in cylindrical form, it could be of any form. It could be constructed of non-opaque plastic to observe the color change of the filter 3, although opaque plastic or metal of sufficient thickness to contain the air pressures involved could be used. Fixed projection 16 in fitting 1 could be of a length to let air out of an inflated tire when lightly engaging the tire stem 24, purpose being to allow air in tire to drain and then refilling with filtered air.

The coiled spring 4 in combination with outer receptacle 5 and inner receptacle 6 could have a compressibility ratio with the amount of elongation of the two receptacles indicated by the calibration shown. Any type of spring means may thus be employed.

In FIGURES 1, 2, and 3 the removable portions that attach at threaded portion 8 to the outer receptacle 5 could use any removably attachable capping means to form an airtight closure of device adapted to open for observing or changing filter 3.

FIGURES 1 and 2 show a well-known air pressure gauge means for obtaining the air pressure from an inflatable tire, and with the use of a piston-cylinder arrangement adapted to contain moisture and ozone filtering means in combination with fitting 2, which by its closure means does not allow any air to leave device from fitting 2 and permits entry of compressed air from air accumulator valve 15. FIG. 1 shows the device positioned between an air accumulator valve 15 and a tire stem 24. The coiled spring 4 could be slightly compressed between projecting shoulders 10 and shoulders 18 pressing open end of inner receptacle 6 against bottom of outer receptacle 5. Pressure of air accumulator valve 15 on fitting 2 when fitting 1 is engaging tire stem 24, prevents elongation of device.

FIG. 2 shows fitting 1 in pressure engagement with tire stem 24. Friction free compressible felt type ring 7 and valve stem 19 keep compressed air from escaping interior of device forcing elongation of receptacles indicating by calibration in p.s.i. air pressure. Any type of air gauge means could be used in combination with a one-way valve and filtering means for similar results. Filter 3 could utilize any means of containing any combination of moisture and ozone absorbent and any form of water soluble dye, having any number of openings to permit a free air flow over filter content's surfaces.

FIG. 3 shows threaded fitting 1 engaging threaded portion of a tire stem 24. Air accumulator valve 15 in pressure engagement with fitting 2 would depress valve stem 19 whose extension rigid stem 28 would depress valve stem 19 of the tire stem 24 allowing compressed air through filter 3 into tire. At removal of pressure of air accumulator valve 15, resilient perforated sheet 23 would assume its original contour and remove rigid stem 28 from contact with valve stem 19 of tire stem 24. Any means to open the valve stem 19 of a tire stem 24 permitting the flow of compressed air over filtering means could be used.

The foregoing is considered as illustrations only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new is as follows:

In combination with a tire stem of an inflatable tire and the outlet valve of an air accumulator, a device consisting of an outer receptacle containing a calibrated inner receptacle in a piston-cylinder arrangement, a first fitting on the end wall of said outer receptacle so adapted to be fitted to said tire stem, a second fitting containing a valve means on said inner receptacle end wall so adapted to be fitted to said outlet valve of an air accumulator, said inner receptacle containing a filtering material consisting of the combination of an absorbent for moisture, an absorbent for ozone and a water soluble dye, a spring means in said outer receptacle and surrounding the exterior of said inner receptacle so fastened and so adapted that said spring tends to hold said inner receptacle recessed within said outer receptacle, said device being so constructed that air from said outlet valve of the air accumulator passes through said filtering material and enters said tire stem and additionally said air causes said inner receptacle to protrude from said outer receptacle in an amount which is directly related to the air pressure in said tire stem.

References Cited
UNITED STATES PATENTS

| | | | |
|---|---|---|---|
| 1,622,341 | 3/1927 | Platt | 137—229 |
| 3,152,877 | 10/1964 | Kaufman | 55—388 X |

REUBEN FRIEDMAN, *Primary Examiner.*

J. ADEE, *Assistant Examiner.*